June 27, 1933.   E. R. EVANS   1,915,598
BRAKE LINKAGE
Filed May 31, 1929   2 Sheets-Sheet 2
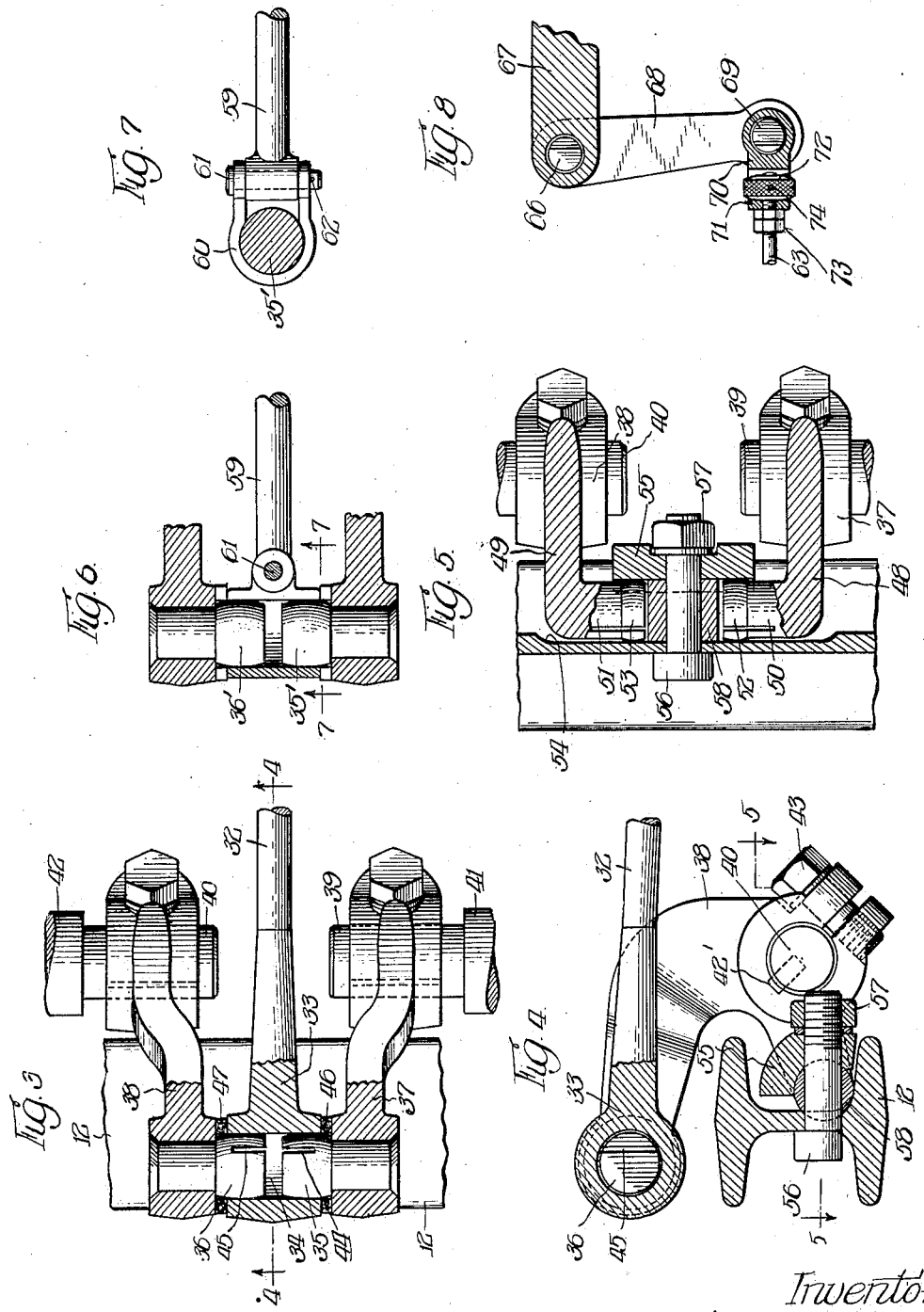
Inventor
Edwin R. Evans,
By Wilkinson Huxley Byron & Knight
Attys Patented June 27, 1933

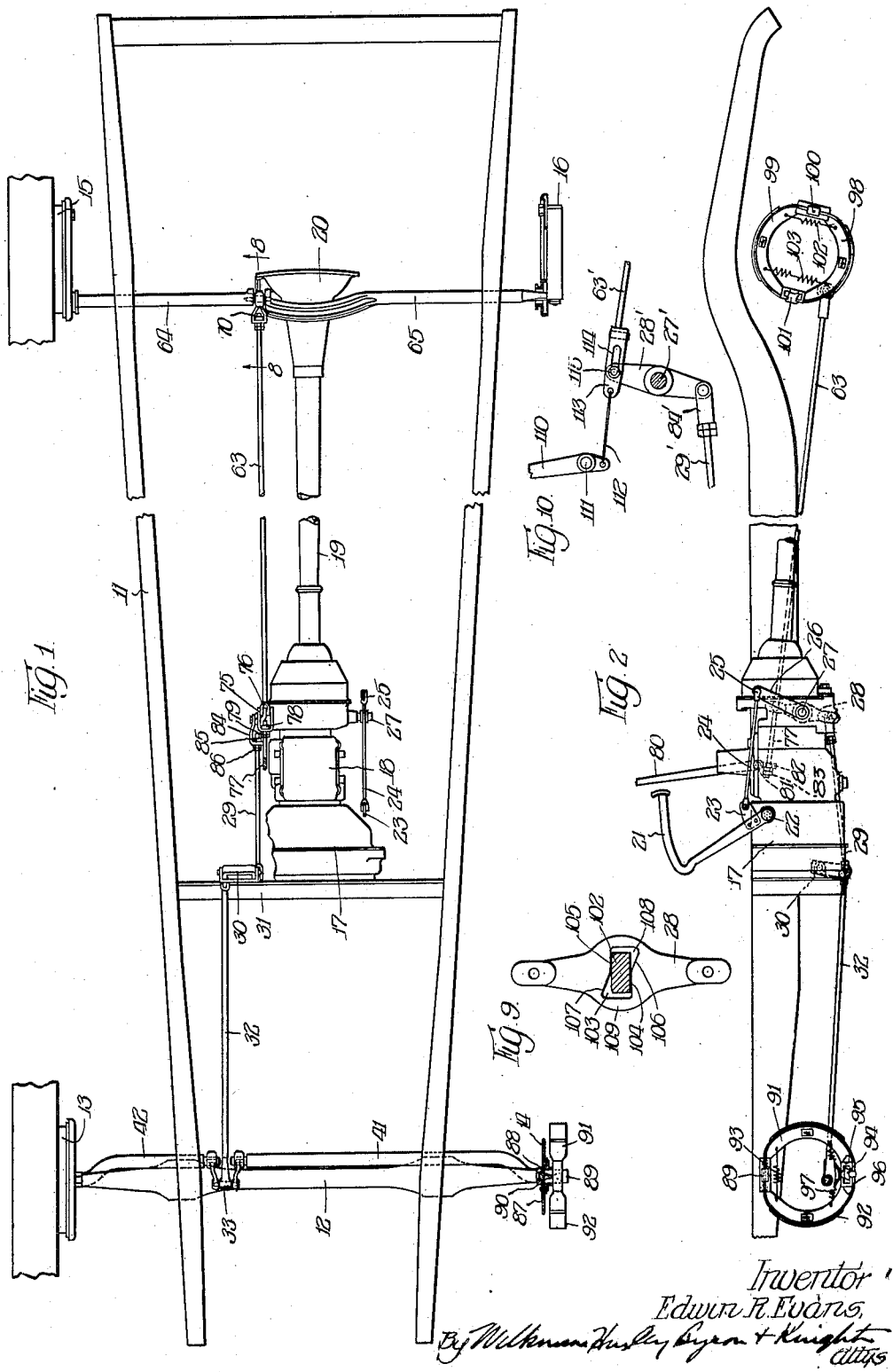

1,915,598

UNITED STATES PATENT OFFICE

EDWIN R. EVANS, OF CHICAGO, ILLINOIS

BRAKE LINKAGE

Application filed May 31, 1929. Serial No. 367,590.

This invention relates to a new and improved chassis brake linkage, and more particularly to such a linkage adapted for use with brake assemblies of the four-wheel type.

It is an object of the present invention to provide a new and improved chassis linkage of the character described.

It is a further object to provide a construction whereby the brakes may be independently operated by a foot pedal or hand lever.

It is also an object to provide a linkage adjusting means whereby uniform adjustment may be secured.

It is an additional object to provide a construction whereby transverse brake shafts are pivotally supported upon the axles in a manner to permit self-adjustment longitudinally and axially.

It is also an object to provide a construction of this character provided with anti-rattler means.

It is a further object to provide an improved connection between pull rods and brake operating shafts to permit self-adjustment and a limited equalization.

It is an additional object to provide a construction which is simple in design and adapted for commercial production and application to existing types of vehicle chassis.

Other and further objects will appear as the description proceeds.

I have illustrated certain preferred embodiments of my invention in the accompanying drawings, in which—

Figure 1 is a plan view of a motor vehicle chassis with my improved brake linkage associated therewith;

Figure 2 is a side elevation of the construction shown in Figure 1, one side of the chassis frame and one pair of wheels being omitted for the sake of clearness;

Figure 3 is a plan view on an enlarged scale and partly broken away, showing the form of connection between the brake pull rod and the front brake cam levers;

Figure 4 is a section taken on line 4—4 of Figure 3;

Figure 5 is a section taken on line 5—5 of Figure 4;

Figure 6 is a fragmentary view similar to Figure 3 and showing a modified form of construction;

Figure 7 is a section taken on line 7—7 of Figure 6;

Figure 8 is a fragmentary section showing the connection of the pull rod to the rear brake shafts;

Figure 9 is a fragmentary section showing the double brake operating lever; and

Figure 10 is a fragmentary elevation showing a modified form of connection.

Referring first to Figures 1 and 2, the chassis frame 11 has connected thereto the front axle 12, and the brake assemblies 13 and 14 are associated with the front wheels of the vehicle. The brake assemblies 15 and 16 are associated with the rear wheels of the vehicle. The vehicle is shown as provided with the clutch housing 17 and gear shift housing 18. Any usual type of engine may be associated with the vehicle but this and the other details of the vehicle construction have been omitted since they form no part of the present invention. The power is transmitted from the gear shift housing 18 through the propeller shaft 19 to the rear axle, a portion of which is shown at 20.

The brake pedal 21 is shown in Figure 2 as pivoted at 22 on the side of the clutch housing 17. The brake pedal 21 is provided with the rearwardly extending portion 23 to which is pivotally connected the pull rod or link 24. The rear end of the rod 24 is pivotally connected at 25 to the arm 26 which is keyed on the shaft 27. This cross shaft 27 has no operative connection with the gear shift mechanism but extends through the gear shift housing transversely, being supported in that housing. The double ended brake operating lever 28 is secured to the end of the shaft 27 opposite to the arm 26 in the manner shown in Figure 9, which will be described hereafter. The lower end of the lever 28 has the front brake operating link 29 connected thereto. The forward end of this link 29 is pivotally connected to an arm of the relay member 29 which member is pivotally supported on a bracket 30 secured to the frame cross member 31. Another arm of the relay member 29 has connected to it the front brake pull rod 32, which rod has at its forward end the connector member 33.

As best shown in Figures 3, 4 and 5, this connector member 33 is provided with a transverse opening 34 into which are fitted the bearing lugs 35 and 36 which are carried by the arms 37 and 38 respectively, these arms being clamped to the end extensions 39 and 40 of the forward cross brake operating shafts 41 and 42. As shown in detail in Figure 4 the arm 38 is keyed to the extension 40 by means of the key 42' and is further retained against displacement by the clamp screw 43. The opposite arm is similarly keyed and clamped to the extension 39 on the cross shaft 41.

It will be noted that the surfaces of the bearing studs 35 and 36 are somewhat rounded or barrel shaped so as to permit slight angular displacement without binding in the member 33. In order to give a close fit and prevent rattling the studs 35 and 36 are slotted as shown at 44 and 45, these slots permitting the studs to be forced into the opening 34 and to fit tightly therein. The slots and the resiliency of the metal permit a tight fit without binding. It will be noted that the slots are located toward the sides of the lugs opposite that upon which the operating thrust is applied so that the lugs will rigidly receive the thrust. The washers 46 and 47 are located about the lugs 35 and 36 between the member 33 and the arms 37 and 38. These washers may be formed of felt and thoroughly saturated with a heavy lubricant so as to prevent admission of dirt or grit into the bearing and so as to serve to lubricate it.

Referring now particularly to Figures 4 and 5, the operating arms 37 and 38 are provided with lower arms 48 and 49 which have inturned end portions 50 and 51 provided with the enlarged bearing portions 52 and 53 which are split similarly to the lugs 35 and 36. The front axle 12 which is of I-beam shape in cross section, has a portion milled out at 54 to serve as a bearing for the enlarged bearing portions 52 and 53. A securing bracket member 55 is held against the front axle 12 at this point by means of the bolt 56 and nut 57. A spacing collar 58 is placed around the bolts so that the bracket 55 is properly spaced from the axle member 12.

The axle member and bracket member together form a bearing which serves to support the ends of the cross shafts by means of the arms 48 and 49 and bearing portions 52 and 53. It will be noted that the bearing portions 52 and 53 are so formed as to give substantial line contact with the axle and bearing bracket. This form of construction permits free movement of the brake cross shafts and prevents binding while permitting a limited angular as well as axial displacement of the shaft. It will be understood that the bearings 52 and 53 serve as pivot points about which the cross shafts 41 and 42 are rotated when the pull rod 32 is drawn back to apply the brake.

A modified form of construction is shown in Figures 6 and 7, which shows a pull rod 59, used for the same purpose as the pull rod 33, and a connector member 60 which connects to the bearing lugs 35' and 36'. This member 60 may be stamped from sheet metal and is secured to the end of the pull rod 59 by means of the pin 61 which may be retained in place by a cotter pin 62. This form of construction will permit a limited equalization of the power applied to the two transverse brake shafts since the member 60 will pivot about the pin 61. This construction also permits the member 60 to be formed from a sheet metal blank which differs from the form of construction shown in Figures 3 and 4 where the end portion 33 cannot be formed in this manner. The sheet metal member will be of sufficient resilience so that the lugs 35' and 36' need not be slotted.

The upper end of double brake lever 28 is connected to pull rod 63 which extends back to the rear transverse brake shafts 64 and 65. The construction at this point is generally similar to that shown in connection with the front wheel brake. The adjacent ends of the two cross shafts 64 and 65 are provided with bearing studs, one of which, that on the shaft 64, is shown at 66 in Figure 8. These bearing studs are supported in a bracket or extension lug 67 which in turn is supported on a portion of the rear axle housing 20. The two cross shafts 64 and 65 are each provided with downwardly extending arms, the arm 68 of cross shaft 64 being shown in Figure 8. These arms carry inwardly directed lug or bearing extensions 69 which are carried in the connector member 70 which is connected to the rear end of the rear brake pull rod 63. This member 70 has a yoke 71 through which the rear end of the rod 63 passes and a knurled nut 72 is threaded on the end of the rod 63 inside of the yoke 71. Lock nuts 73 are provided for locking the connection in adjusted position. The knurled nut 72 is also provided with openings 74 for use with a spanner wrench in adjusting the nut.

As shown in Figure 1 a yoke 75 is provided which spans the front end 76 of the rear pull rod 63, and which is secured pivotally to the upper end of the double lever 28. This yoke 75 receives the end of the emergency brake or hand brake pull rod 77. The end of this rod inside the yoke 75 carries a knurled nut 78 similar to that shown in Figure 8 and two lock nuts 79 are provided for maintaining the adjustment. The hand lever 80, as best shown in Figure 2, is pivoted at 81 to the side of the gear case 18, and has a lower extension 82 through which the end of the pull rod 77 passes. The pull rod 77 passes freely through the opening in the lower extension 82 of the hand lever 80 and its end is provided with a pair of nuts 83, which may be locked together to serve as a limiting stop through which the movement of the hand lever 80 may be transmitted to the pull rod 77. This form of connection permits overrunning the pull rod 77 through the hand lever 80 without affecting the hand lever. This permits brake operation by means of the foot pedal without disturbing the hand lever adjustment.

The connection of the front brake pull rod 29 to the lower end of the double lever 28 is made by a yoke 84, knurled nut 85 and lock nut 86 which are similar to those shown in Figure 8 in connection with the rear brake. This construction is shown on Figure 1 of the drawings.

As shown somewhat diagrammatically in Figures 1 and 2 the front wheel brakes comprise a back plate 87 upon which is riveted a fixed bearing bracket 88, and adjustably fitted in this bracket 88 is the adjustable bearing member 89 which may be adjusted by means of the nut 90. This adjustment by means of nut 90 serves to move the member 89 inwardly toward the supporting plate 87 or outwardly away from that plate. As shown in Figure 1 the brake shoes 91 and 92 are provided with ends cut on an angle and fitting in slots milled in the member 89. A retraction of the member 89 toward the backing plate 87 thus serves to separate the brake shoes 91 and 92. This may be done to bring the shoes into tight engagement with the brake drums, after which their adjustment may be determined by backing off the nut, a predetermined distance, to retract the shoes a corresponding distance from actual engagement with the brake drum.

As shown in Figure 2 the spring 93 is provided for retaining the brake shoes 91 and 92 in engagement with the member 89. The front brake cross shaft 41 is provided on its end with an operating cam member 94, shown in Figure 2, which fits between and bears upon bearing members 95 and 96 which are secured by rivets to the end of the brake shoes 91 and 92. A spring 97 is provided for retracting the brake shoes and holding them in contact with the operating cam.

The rear brakes as shown in Figures 1 and 2 are constructed in a similar manner. The brake shoes 98 and 99 are pivotally supported on an adjustable member 100 and are separated by the operating cam 101 which is carried on the end of the transverse brake shaft 65. The usual springs 102 and 103 are provided for holding the brake shoes against the adjustable pivot support 100 and against the operating cam 101. The details of these brake constructions insofar as they relate to the specific construction carried adjacent each wheel, are disclosed in my copending application Serial No. 366,217, filed May 27, 1929.

Referring now to the form of construction shown in Figure 9, the rectangular member 102 is the end of the cross shaft 27 and it is fitted in an opening 103 formed in the double lever 28. This opening 103 has two opposed bearing surfaces 104 and 105 which engage opposite faces of the shaft end 102. It also has the second pair of bearing surfaces 106 and 107 in angular relation to the surfaces 104 and 105. The ends 108 and 109 are spaced slightly from the ends of the member 102 which permits an equalization of the power supplied to the front and rear pull rods 29 and 63.

In applying the brakes the lever 28 is rocked in the counterclockwise direction as seen in Figures 1 and 9. If the brake applying power is supplied from the foot pedal 21 through link 24, arm 26 and cross shaft 27, the end 102 of the shaft 27 is in the position shown in Figure 9 and engages the surfaces 104 and 105. The movement of the lever 28 is not transmitted to the hand brake lever 80 as the pull rod 77 merely slides through the lower end 82 of the hand lever. If the power is applied to lever 28 by means of the hand lever 80 and pull rod 77, the shaft 27 is not rotated but the lever 28 rocks on the squared end 102 of the shaft 27. The angle between the pair of surfaces 104 and 105 and the surfaces 106 and 107 permits this movement.

The slight clearances between the surfaces 108 and 109 and the squared lever portion 102 permits the lever 28 to float on the squared portion 102 when power is applied through shaft 27 and to thus equalize the force applied to the front and rear pull rods. In order to vary the braking effect on the front and rear brakes, the lever arms operating the brakes may be made of different lengths. In the form of construction shown, the rear lever arm 68, shown in Figure 8, is longer than the lever arm between the lug 36 and lug 53 as shown in Figures 4 and 5. This greater lever arm on the rear brakes causes less braking on the rear wheel since with the two arms of the double lever 28 the same in length, the travel of the front and rear pull rods will be the same. With a greater lever arm and the same linear travel of the end of the lever there is less angular travel and consequently less movement of the brake actuating cam.

A modified form of connection is shown in Figure 10 where the hand lever 110 is pivotally supported at 111 and has the pull cable 112 connected to its portion below the pivot. This cable 112 is connected to a member 113 having slotted openings 114 formed thereon. These openings 114 engage a pin 115 carried by the upper end of the double lever 28' supported on shaft 27'. The member 113 is also connected to the rear brake pull rod 63', which is connected to the rear brake operating mechanism as shown in Figures 1 and 2. The lower end of the double lever 28' has the connector 84' and front pull rod 29' connected thereto.

In the operation of this form of construction, the power when supplied through shaft 27' rotates the double lever 28' in the counter-clockwise direction pulling on the front rod 29' and also pulling on the rear pull rod 63' by means of the engagement of the pin 115, with the front end of the slots 114 in the member 113. When the hand lever 110 is rocked in the clockwise direction about its pivot 111 to put on the brakes, it will pull member 113 by means of cable 112 and put on the rear brakes only. The slots 114 will permit movement of the member 113 without movement of the double lever 28' or pin 115. Thus the use of the hand brake is independent of the braking by means of the cross shaft 27'. When braking by means of the double lever 28', the cable 112 will merely flex and will not affect the position of lever 110.

The transverse brake shafts or cam shafts 41 and 42 and also the rear, brake shafts 64 and 65 are all shown as made of substantially the same cross sectional area throughout their extent except for the reduced and shaped ends. The section of shaft 65 which is bowed to pass around the differential housing may be formed of I-beam section for greater stiffness, as shown in Figure 1. This construction permits the shafts to be made from rolled sections with a minimum amount of working during the forging operations in shaping and finishing the shafts.

The attachment yokes such as 84 and 70 may be made from sheet metal by a stamping process. They may be formed of any width of opening for attachment to a lever with a standard width of opening at the closed end of the yoke to receive the knurled nuts 72, or the like, which are threaded on the ends of the pull rods.

The knurled nuts 72 at the ends of the pull rods are an important feature in securing the proper tension in the pull rods. These nuts may each be tightened up as much as possible with the fingers and then may be further tightened a specified number of notches by means of wrenches fitting the holes 74. By counting the number of holes through which the nuts are turned it is possible to get a uniform adjustment throughout. These nuts are rounded at the edges of the knurled portion which makes its easier to grip the nuts with the fingers and they further have a reduced bearing on the yokes which minimize frictional resistance to their rotation.

While I have shown one preferred embodiment of my invention it is to be understood that it may be modified and changed to meet varying conditions and to adapt it to different vehicle chassis, and I contemplate such changes and modifications as come within the spirit and scope of the appended claims.

I claim:

1. A brake linkage, comprising a pair of brakes, an axle, a pair of transverse brake shafts supported at one end in the brakes and at another point on the axle, the axle support comprising a housing receiving a brake shaft end and permitting a limited angular and linear movement of the shaft, and means for rotating the shafts.

2. A brake linkage, comprising a pair of brakes, an axle, a pair of transverse brake shafts supported at one end in the brakes, a cylindrical brake shaft bearing on the axle, and rounded bearing lugs on said brake shafts fitted in the bearing.

3. A brake linkage, comprising a pair of brakes, an axle, a pair of transverse brake shafts supported at one end in the brakes, a brake shaft bearing on the axle, and a rounded bearing lug on a brake shaft fitted in the bearing, said bearing lug being split and resiliently held in the bearing due to the split.

4. A brake linkage, comprising a pair of brakes, an axle, a pair of transverse brake shafts, bearings on the axle, the brake shafts having bearing portions fitted in said bearings, arms extending from the shafts having lugs extending therefrom, a tubular member receiving the lugs, and means to impart a braking force to the tubular member.

5. A brake linkage, comprising a pair of brakes, an axle, a pair of transverse brake shafts, bearings on the axle, the brake shafts having bearing portions fitted in said bearings, arms extending from the shafts having lugs extending therefrom, a tubular member receiving the lugs, the lugs having rounded portions fitting in the tubular member, and means to impart a braking force to the tubular member.

6. A brake linkage, comprising a pair of brakes, an axle, a pair of transverse brake shafts, bearings on the axle, the brake shafts having bearing portions fitted in said bearings, arms extending from the shafts having lugs extending therefrom, a tubular member receiving the lugs, yielding means fitting about the lugs between the arms and the ends of the tubular member, and means to impart a braking force to the tubular member.

7. A brake linkage, comprising a pair of brakes, an axle, a pair of transverse brake shafts, bearings on the axle, the brake shafts having bearing portions fitted in said bearings, arms extending from the shafts having lugs extending therefrom, a tubular member receiving the lugs, lubricant saturated felt washers fitting between the arms and the ends of the tubular member, and means to impart a braking force to the tubular member.

8. In a brake construction, an operating lever, a transverse shaft rocked by said lever, a double lever, means connecting one end of the double lever to braking means, means connecting the other end of the double lever to a second braking means, and a squared portion of the transverse shaft fitting in an enlarged opening in the double lever whereby the lever may have a limited rotative and lateral movement independent of the movement of the transverse shaft.

9. In a brake construction, an operating lever, a transverse shaft rocked by said lever, a double lever, means connecting one end of the double lever to braking means, means connecting the other end of the double lever to a second braking means, a squared portion of the transverse shaft fitting in an enlarged opening in the double lever whereby the lever may have a limited rotative and lateral movement independent of the movement of the transverse shaft, and a second operating lever connected to the double lever independently of the transverse shaft.

10. In a brake construction, an operating lever, a transverse shaft rocked by said lever, a double lever, means connecting one end of the double lever to braking means, means connecting the other end of the double lever to a second braking means, a squared portion of the transverse shaft fitting in an enlarged opening in the double lever whereby the lever may have a limited rotative and lateral movement independent of the movement of the transverse shaft, and a second operating lever connected to the double lever independently of the transverse shaft, the connection betweeen the double lever and second operating lever permitting rotative movement of the double lever independently of the second operating lever.

11. In a brake linkage for motor vehicles, a rotatable brake actuating rock shaft, a double arm brake lever supported by said shaft, said shaft having a portion non-circular in cross section engaging an opening formed in said lever, brake operating pull rods connected to the opposite ends of said lever extending for actuation of the front and rear brakes of the vehicle, an independent operating connection to one end of said lever, the opening in said lever which receives said shaft being formed to permit rotative movement of said lever independent of said rock shaft and to permit lateral movement of said lever with respect to said rock shaft for equalizing the braking pressure between the front and rear sets of brakes.

12. In a brake linkage for motor vehicles, a rotatable brake actuating rock shaft having a squared end, a double arm brake lever having a slotted opening for supporting said lever on the squared end of said rock shaft, said lever in normal position being in substantially vertical position, brake operating pull rods connected to the opposite ends of said lever and extending for actuation of the front and rear brakes of the vehicle, an independent operating connection to one end of said lever, the slotted opening in said lever being larger horizontally than the squared portion of said rock shaft permitting said lever to move laterally with respect to said rock shaft to equalize the braking pressure between the front and rear sets of brakes and diagonally opposite corners of said slotted opening in said lever being cut away to permit rockable actuation of said lever by said independent operating connection without movement of said rock shaft.

13. In a brake linkage, an axle, a pair of brakes supported by said axle, a pair of brake actuating rock shafts supported at their outer ends by said brakes, bearing portions rigid with said axle, said rock shafts being pivotally supported at their inner ends by said bearing portions and free to have linear movement with respect thereto, lever arms rigid with the inner ends of said rock shafts and a single pull rod for operating and transmitting movement to said lever arms and said rock shafts.

14. In a brake linkage, an axle, a pair of brakes supported by said axle, a substantially tubular bearing on said axle, a pair of brake actuating rock shafts supported at their outer ends by said brakes and supported at their inner ends by rounded portions rigid therewith fitting coaxially into said tubular bearing, a pair of lever arms rigid with the inner ends of said shafts, said lever arms having rounded co-axially disposed extensions, a substantially tubular member receiving the rounded extensions of both said lever arms and a single pull rod for operatively transmitting movement to said lever arms and said rock shafts whereby said rock shafts are free for linear movements with respect to said axle.

Signed at Chicago, Illinois, this 24th day of May, 1929.

EDWIN R. EVANS.